(12) United States Patent
Kim

(10) Patent No.: US 10,810,885 B2
(45) Date of Patent: Oct. 20, 2020

(54) METHOD AND APPARATUS FOR TRANSMITTING DATA OF UNMANNED AERIAL VEHICLE CONTROL SYSTEM

(71) Applicant: Electronics and Telecommunications Research Institute, Daejeon (KR)

(72) Inventor: Hee Wook Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 274 days.

(21) Appl. No.: 16/141,763

(22) Filed: Sep. 25, 2018

(65) Prior Publication Data

US 2020/0005653 A1 Jan. 2, 2020

(30) Foreign Application Priority Data

Jul. 2, 2018 (KR) ........................ 10-2018-0076408

(51) Int. Cl.
*G08G 5/00* (2006.01)
*H04W 4/40* (2018.01)
(Continued)

(52) U.S. Cl.
CPC ............ *G08G 5/0013* (2013.01); *H04W 4/40* (2018.02); *H04W 52/325* (2013.01);
(Continued)

(58) Field of Classification Search
CPC .... G08G 5/0013; H04W 4/40; H04W 52/367; H04W 52/325; H04W 52/38;
(Continued)

(56) References Cited

U.S. PATENT DOCUMENTS

| 2004/0192293 A1* | 9/2004 | Karabinis | .......... H04B 7/18543 |
| | | | 455/427 |
| 2006/0094352 A1* | 5/2006 | Karabinis | .......... H04B 7/18563 |
| | | | 455/13.4 |

(Continued)

FOREIGN PATENT DOCUMENTS

| KR | 101076187 B1 | 10/2011 |
| KR | 1020130085884 A | 7/2013 |

(Continued)

*Primary Examiner* — Yuwen Pan
*Assistant Examiner* — Angelica M Perez
(74) *Attorney, Agent, or Firm* — William Park & Associates Ltd.

(57) ABSTRACT

Disclosed is a method and apparatus for transmitting data of an unmanned aerial vehicle control system. According to an embodiment of the present disclosure, provided is a method of transmitting data of an unmanned aerial vehicle control system, the method including: connecting an unmanned aerial vehicle to a ground radio station via a mission data link and a non-mission data link; checking a maximum transmit power of the non-mission data link; checking a margin value of the non-mission data link considering a state of the unmanned aerial vehicle; checking a required transmit power of the non-mission data link by applying the margin value of the non-mission data link; and determining a transmit power of the non-mission data link by comparing the maximum transmit power with the required transmit power.

15 Claims, 12 Drawing Sheets

(51) Int. Cl.
*H04W 52/32* (2009.01)
*H04W 52/36* (2009.01)
*H04W 52/38* (2009.01)
G07C 5/00 (2006.01)
B64C 39/02 (2006.01)

(52) U.S. Cl.
CPC ......... *H04W 52/367* (2013.01); *H04W 52/38* (2013.01); *B64C 39/024* (2013.01); *B64C 2201/126* (2013.01); *B64C 2201/148* (2013.01); *G07C 5/008* (2013.01)

(58) Field of Classification Search
CPC ............ B64C 39/024; B64C 2201/126; B64C 2201/148; G07C 5/008
See application file for complete search history.

(56) References Cited

U.S. PATENT DOCUMENTS

| | | | |
|---|---|---|---|
| 2016/0183290 A1 | 6/2016 | Ko et al. | |
| 2016/0376000 A1* | 12/2016 | Kohstall | B63G 8/08 |
| | | | 114/313 |
| 2017/0215178 A1 | 7/2017 | Kim et al. | |
| 2017/0215220 A1 | 7/2017 | Kim et al. | |
| 2019/0236962 A1* | 8/2019 | Tholen | H04N 7/1716 |

FOREIGN PATENT DOCUMENTS

| | | |
|---|---|---|
| KR | 1020150117879 A | 10/2015 |
| KR | 101655295 B1 | 9/2016 |
| KR | 1020170089582 A | 8/2017 |
| WO | 2008085776 A2 | 7/2008 |
| WO | 2012112807 A1 | 8/2012 |

\* cited by examiner

METHOD AND APPARATUS FOR TRANSMITTING DATA OF UNMANNED AERIAL VEHICLE CONTROL SYSTEM

CROSS REFERENCE TO RELATED APPLICATION

The present application claims priority to Korean Patent Application No. 10-2018-0076408, filed Jul. 2, 2018, the entire contents of which is incorporated herein for all purposes by this reference.

BACKGROUND OF THE INVENTION

Field of the Invention

The present disclosure relates generally to a method and apparatus for transmitting data in a wireless manner. More particularly, the present disclosure relates to a method and apparatus for controlling strength of a wireless signal.

Description of the Related Art

In order to control an unmanned aerial vehicle (UAV) via wireless communications, a control and non-payload communication (hereinafter, referred to as "CNPC") system for the unmanned aerial vehicle have been studied.

CNPC systems may be classified into a point-to-point (P2P) type and a point-to-multipoint (P2MP) type. The point-to-point (P2P) type system is the form that the unmanned aerial vehicle is directly connected to a ground control station (hereinafter, referred to as "GCS"). A fixed wireless channel for control is allocated, and the unmanned aerial vehicle and the GCS transmit and receive a signal for control through the fixed channel. Since the point-to-point (P2P) type uses a fixed channel, there is a problem the using a dynamic channel is difficult.

In contrast, the point-to-multipoint (P2MP) type may be configured in such a manner as to form a CNPC link between at least one ground radio station (GRS) and the unmanned aerial vehicle. Particularly, the GRS may form CNPC links with multiple unmanned aerial vehicles.

The unmanned aerial vehicle may be configured in such a manner as to perform transmission constantly with the maximum transmit power so as to increase its CNPC link availability. However, in this case, interference with adjacent channels may occur, and a problem that more transmit power than necessary is used may occur.

The foregoing is intended merely to aid in the understanding of the background of the present disclosure, and is not intended to mean that the present disclosure falls within the purview of the related art that is already known to those skilled in the art.

SUMMARY OF THE INVENTION

In order to solve the above-described problems, each transmission radio station, namely, the unmanned aerial vehicle needs to perform control in such a manner as to transmit a signal with such a transmit power that the signal is received at a reception SNR level which is required by a reception radio station, namely, the ground radio station.

Also, in controlling the power for transmitting a signal by the unmanned aerial vehicle, accuracy of a power control command may decrease due to propagation delay, and thus the transmit power needs to be controlled considering CNPC slow fading channel characteristics of the unmanned aerial vehicle, the propagation delay, and the like.

The present disclosure is intended to propose a method and apparatus for controlling a transmit power, in an unmanned aerial vehicle control system, the method and apparatus being capable of increasing CNPC link availability and minimizing interference with other links.

It is to be understood that technical problems to be solved by the present disclosure are not limited to the aforementioned technical problems and other technical problems which are not mentioned will be apparent from the following description to a person with an ordinary skill in the art to which the present disclosure pertains.

According to one aspect of the present disclosure, there is provided a method of transmitting data of an unmanned aerial vehicle control system, the method including: connecting an unmanned aerial vehicle to a ground radio station via a mission data link and a non-mission data link; checking a maximum transmit power of the non-mission data link; checking a margin value of the non-mission data link considering a state of the unmanned aerial vehicle; checking a required transmit power of the non-mission data link by applying the margin value of the non-mission data link; and determining a transmit power of the non-mission data link by comparing the maximum transmit power with the required transmit power.

According to another aspect of the present disclosure, there is provided a method of transmitting data of an unmanned aerial vehicle control system, the method including: connecting an unmanned aerial vehicle to a ground radio station via a mission data link and a non-mission data link; generating power control command information on the basis of a signal received by the ground radio station from the unmanned aerial vehicle via the non-mission data link; generating a data frame including the power control command information; and transmitting the data frame.

According to still another aspect of the present disclosure, there is provided a method of transmitting data of an unmanned aerial vehicle control system, the method including: connecting an unmanned aerial vehicle to a ground radio station via a mission data link and a non-mission data link; receiving a data frame including power control command information from the ground radio station; checking the power control command information from the data frame; checking a maximum transmit power of the non-mission data link; checking a margin value of the non-mission data link considering a state of the unmanned aerial vehicle; checking a required transmit power of the non-mission data link by applying the power control command information and the margin value of the non-mission data link; and determining a transmit power of the non-mission data link by comparing the maximum transmit power with the required transmit power.

According to still another aspect of the present disclosure, there is provided an apparatus for transmitting data of an unmanned aerial vehicle control system, the apparatus including: a communication unit connecting an unmanned aerial vehicle to a ground radio station via a mission data link and a non-mission data link; a maximum transmit power checking unit checking a maximum transmit power of the non-mission data link; a margin value checking unit checking a margin value of the non-mission data link considering a state of the unmanned aerial vehicle; and a transmit power determining unit checking a required transmit power of the non-mission data link by applying the margin value of the non-mission data link, the transmit power determining unit determining a transmit power of the non-mission data link by comparing the maximum transmit power with the required transmit power.

According to still another aspect of the present disclosure, there is provided an apparatus for transmitting data of an unmanned aerial vehicle control system, the apparatus including: a communication unit making a connection to a ground radio station via a mission data link and non-mission data link, the communication unit receiving a data frame including power control command information from the ground radio station; a power control command information checking unit checking the power control command information from the data frame; a maximum transmit power checking unit checking a maximum transmit power of the non-mission data link; a margin value checking unit checking a margin value of the non-mission data link considering a state of the unmanned aerial vehicle; and a transmit power determining unit checking a required transmit power of the non-mission data link by applying the power control command information and the margin value of the non-mission data link, the transmit power determining unit determining a transmit power of the non-mission data link by comparing the maximum transmit power with the required transmit power.

It is to be understood that the foregoing summarized features are exemplary aspects of the following detailed description of the present disclosure without limiting the scope of the present disclosure.

According to the present disclosure, in the unmanned aerial vehicle control system, provided is a method and apparatus for controlling a transmit power, the method and apparatus being capable of increasing CNPC link availability and minimizing interference with other links.

Effects that may be obtained from the present disclosure will not be limited to only the above described effects. In addition, other effects which are not described herein will become apparent to those skilled in the art from the following description.

BRIEF DESCRIPTION OF THE DRAWINGS

The above and other objects, features and other advantages of the present disclosure will be more clearly understood from the following detailed description when taken in conjunction with the accompanying drawings, in which.

DETAILED DESCRIPTION OF THE INVENTION

Figure 1:
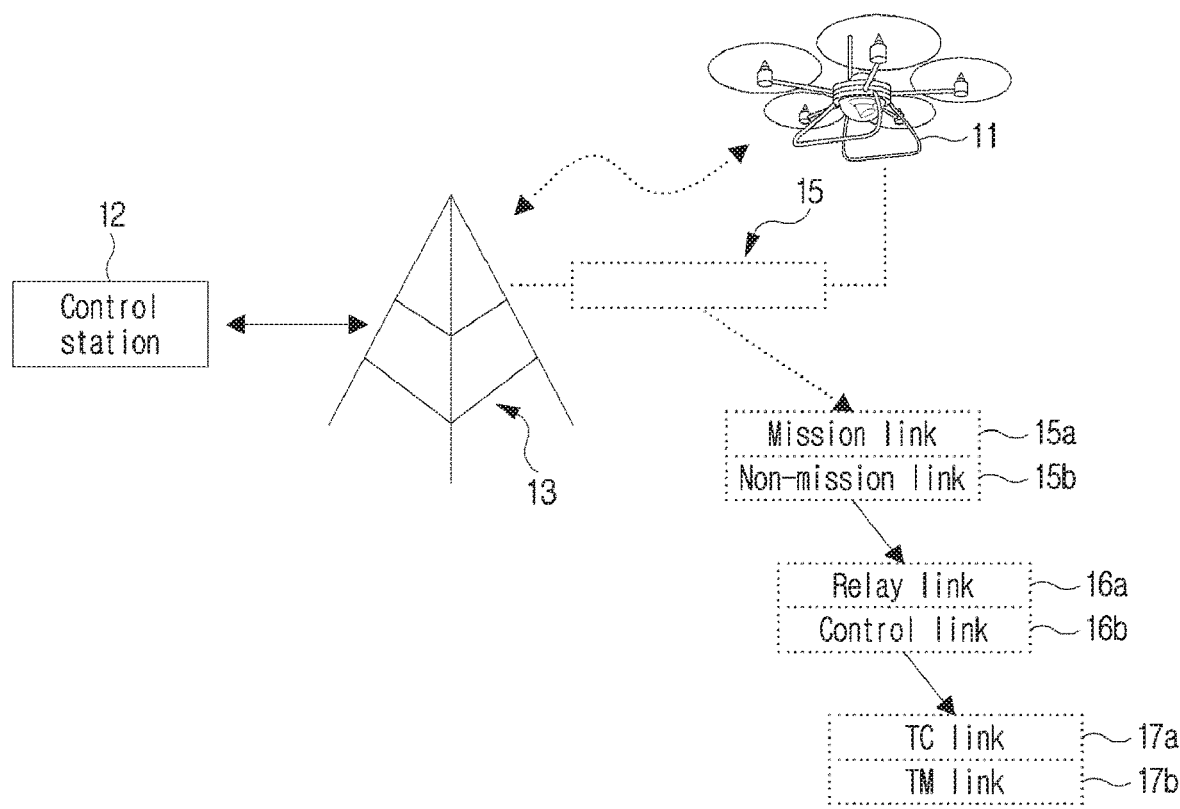
FIG. 1 is an exemplary diagram illustrating an unmanned aerial vehicle control system to which a method of transmitting data is applied according to an embodiment of the present disclosure.

Hereinbelow, exemplary embodiments of the present disclosure will be described in detail with reference to the accompanying drawings such that the present disclosure can be easily embodied by one of ordinary skill in the art to which this invention belongs. However, the present disclosure may be variously embodied, without being limited to the exemplary embodiments.

In the description of the present disclosure, the detailed descriptions of known constitutions or functions thereof may be omitted if they make the gist of the present disclosure unclear. Also, portions that are not related to the present disclosure are omitted in the drawings, and like reference numerals designate like elements.

In the present disclosure, when an element is referred to as being "coupled to", "combined with", or "connected to" another element, it may be connected directly to, combined directly with, or coupled directly to another element or be connected to, combined directly with, or coupled to another element, having the other element intervening therebetween. Also, it should be understood that when a component "includes" or "has" an element, unless there is another opposite description thereto, the component does not exclude another element but may further include the other element.

In the present disclosure, the terms "first", "second", etc. are only used to distinguish one element, from another element. Unless specifically stated otherwise, the terms "first", "second", etc. do not denote an order or importance. Therefore, a first element of an embodiment could be termed a second element of another embodiment without departing from the scope of the present disclosure. Similarly, a second element of an embodiment could also be termed a first element of another embodiment.

In the present disclosure, components that are distinguished from each other to clearly describe each feature do not necessarily denote that the components are separated. That is, a plurality of components may be integrated into one hardware or software unit, or one component may be distributed into a plurality of hardware or software units. Accordingly, even if not mentioned, the integrated or distributed embodiments are included in the scope of the present disclosure.

In the present disclosure, components described in various embodiments do not denote essential components, and some of the components may be optional. Accordingly, an embodiment that includes a subset of components described in another embodiment is included in the scope of the present disclosure. Also, an embodiment that includes the components described in the various embodiments and additional other components are included in the scope of the present disclosure.

Hereinbelow, exemplary embodiments of the present disclosure will be described in detail with reference to the accompanying drawings.

FIG. 1 is an exemplary diagram illustrating an unmanned aerial vehicle control system to which a method of transmitting data is applied according to an embodiment of the present disclosure.

The unmanned aerial vehicle control system 1 may include an unmanned aerial vehicle 11, a control station 12, and a ground radio station 13.

The unmanned aerial vehicle 11 may receive mission information from the control station 12, and the mission information may be received via the ground radio station 13. Here, the mission information may include: movement instruction information on movement of the unmanned aerial vehicle 11; and mission execution information processed by the unmanned aerial vehicle 11. Accordingly, the unmanned aerial vehicle 11 may check the movement instruction information from the mission information, and may move to the position relevant to the checked movement instruction information on the basis thereof.

For example, the movement instruction information may include: movement position information instructing the position to which the unmanned aerial vehicle 11 is to be moved; and movement way information instructing the way from the current position of the unmanned aerial vehicle 11 to the position to which the unmanned aerial vehicle 11 is to be moved. Here, the movement way information may include at least one piece of way point information. The way point information may include coordinates information containing the longitude and the latitude, altitude information, and the like.

In the meantime, the control station 12 may provide an input interface receiving control commands for controlling the unmanned aerial vehicle 11. The input interfaces may include a hardware input key or a software input key which displayed on a display device capable of touch input. The control station 12 may provide the input interface and may check the user input via the input interface. Also, on the basis of a predefined relation between the user input of the input interface and the control command, the control station 12 may check the control command that the user input indicates, and may generate the mission information including the control command.

The control station 12 may transmit the mission information for controlling movement of the unmanned aerial vehicle 11 to the unmanned aerial vehicle 11. As described above, the mission information may include the movement position information, the movement way information, and the like, or may include speed control information, movement direction control information, and the like.

In the meantime, the unmanned aerial vehicle 11 may be connected to the control station 12 via a data link 15.

The data link 15 established between the unmanned aerial vehicle 11 and the control station 12 may include a mission link 15a and a non-mission link 15b. The unmanned aerial vehicle 11 and the ground radio station 13 may transmit or receive data related to mission execution via the mission link 15a, and may transmit information for controlling the unmanned aerial vehicle 11 or information indicating the state of the unmanned aerial vehicle 11 via the non-mission (also referred to as control and non-payload communication (CNPC)) link 15b.

Figure 2A:
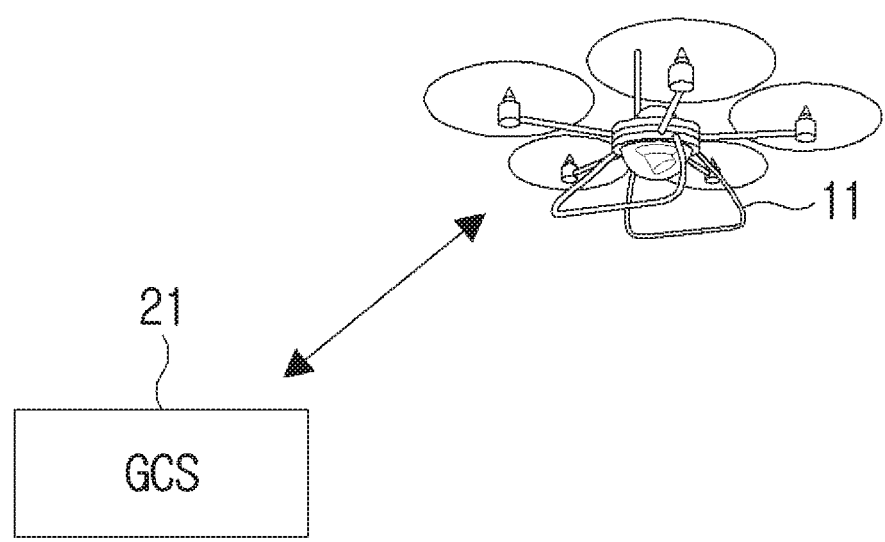
FIGS. 2A and 2B are exemplary diagrams illustrating connection forms of CNPC links used in a method of transmitting data according to an embodiment of the present disclosure.
Figure 2B:
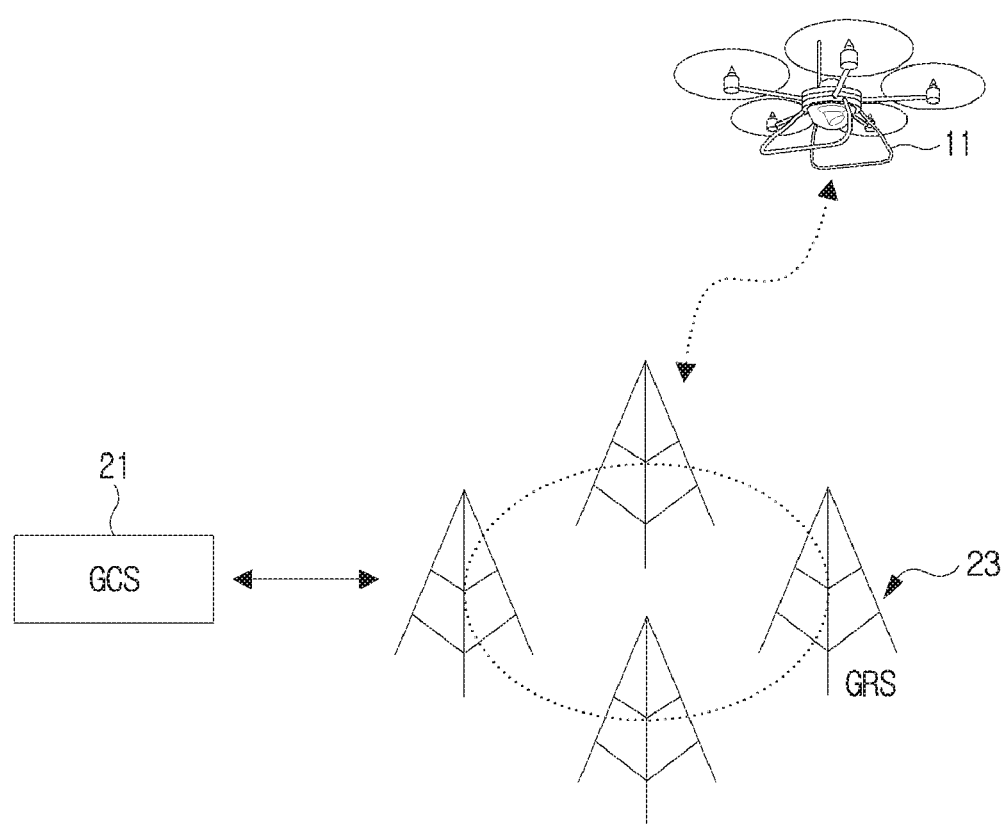

Connection forms of the CNPC link 15b may include a point-to-point (P2P) type and a network-based point-to-multipoint (P2MP) type. The P2P type may be configured in such a manner that one ground control station (hereinafter, referred to as "GCS") 21 (referring to FIG. 2A) is formed with a data communication link directly to the unmanned aerial vehicle 11. The network-based P2MP type may be configured in such a manner that one or more ground radio stations (hereinafter, referred to as "GRSs") 23 (referring to FIG. 2B) are in cooperation with each other over a network and each GCS 21 exchanges information with the unmanned aerial vehicle 11 via one or more GRSs 23 connected over a network.

According to the embodiment of the present disclosure, the connection form of the CNPC link 15b in the unmanned aerial vehicle control system is the network-based P2MP type.

For stable operation of the unmanned aerial vehicle 11 and an increasing demand for the unmanned aerial vehicle 11, required is an unmanned aerial vehicle control system capable of effectively operating multiple unmanned aerial vehicles 11 in a limited dedicated frequency band for controlling the unmanned aerial vehicle. According to the embodiment of the present disclosure, proposed is the unmanned aerial vehicle control system that is compatible with a pre-established unmanned aerial vehicle control system, for example, a pre-established CNPC system.

In the meantime, the CNPC link 15b may include a relay link 16a and a control link 16b. The relay link 16a may be a link for transmitting and receiving data required to relay voice and data between an air traffic control (hereinafter, referred to as "ATC") center and the ground radio station 13 via the unmanned aerial vehicle 11. The control link 16b may include a telecommand (hereinafter, referred to as "TC") link 17a and a telemetry (hereinafter, referred to as "TM") link 17b.

Here, the TC link 17a is an uplink through which flight track control information, any type of unmanned aerial system control information required for safe flight, and the like are transmitted from the ground radio station 13 to the unmanned aerial vehicle 11. The TM link 17b is a downlink through which the position, altitude, and speed of the unmanned aerial vehicle 11, the operation mode and state of an unmanned aircraft system (UAS), navigation aid data, detection and avoidance-related tracking, weather radar, and image information are transmitted from the unmanned aerial vehicle 11 to the ground radio station 13.

In general, a C band (5030 to 5091 MHz), which is allocated as a new dedicated band in WRC-12, is considered as a frequency for the CNPC link 15b. Furthermore, a band, such as an L band (960 to 1164 MHz) allocated for an aeronautical mobile service may be considered, wherein the L band has standards to be used for the aeronautical mobile service in WRC-12. In the case of the C band, frequency interference influence from an existing system and multipath delay spread are small, but the use of a directional antenna needs to be considered to ensure the link margin and the Doppler effect is five times larger than for the L band. On the contrary, in the case of a low the frequency band, such as the L band, allocated for another aeronautical mobile service, the propagation characteristics are better than that of the C band (the L band has the propagation loss lower by about 14 dB than the C band), but existing aeronautic systems, such as distance measurement equipment (DME), an automatic dependent surveillance-broadcast (ADS-B) system, a tactical air navigation system (TACAN), and the like, operate in a congested manner resulting in difficulty in securing the frequency and the multipath delay spread is large. Therefore, usually, the pre-secured C band is considered as a base band of the CNPC link 15b, and the low frequency band (L or UHF band, and the like) is used to increase availability of the CNPC link 15b for safe navigation of the unmanned aerial vehicle.

In a national airspace, a communication link with high reliability is required for safe navigation of the unmanned aerial vehicle 11, and thus a CNPC system requires high link availability of 99.8%.

The unmanned aerial vehicle 11 may be configured in such a manner as to perform transmission constantly with the maximum transmit power so as to increase its communication link availability. However, in this case, interference between adjacent channels may occur, and a problem that more transmit power than necessary is used may occur.

Therefore, a measure to manage interference between adjacent channels is required. Considering this, in order to reduce interference between adjacent systems or adjacent ground radio stations, each transmission radio station, namely, the unmanned aerial vehicle 11 needs to perform control in such a manner as to transmit a signal with such a transmit power that the signal is received at a reception SNR level which is required by a reception radio station, namely, the ground radio station 13.

Also, in controlling, by the unmanned aerial vehicle 11, the power for transmitting the signal, the accuracy of the power control command may decrease due to the propagation delay, and thus the transmit power needs to be controlled considering CNPC slow fading channel characteristics of the unmanned aerial vehicle 11, propagation delay, and the like.

Considering the above description, the unmanned aerial vehicle control system according to the embodiment of the present disclosure proposes a system capable of controlling transmit power effectively and stably.

Figure 3A:
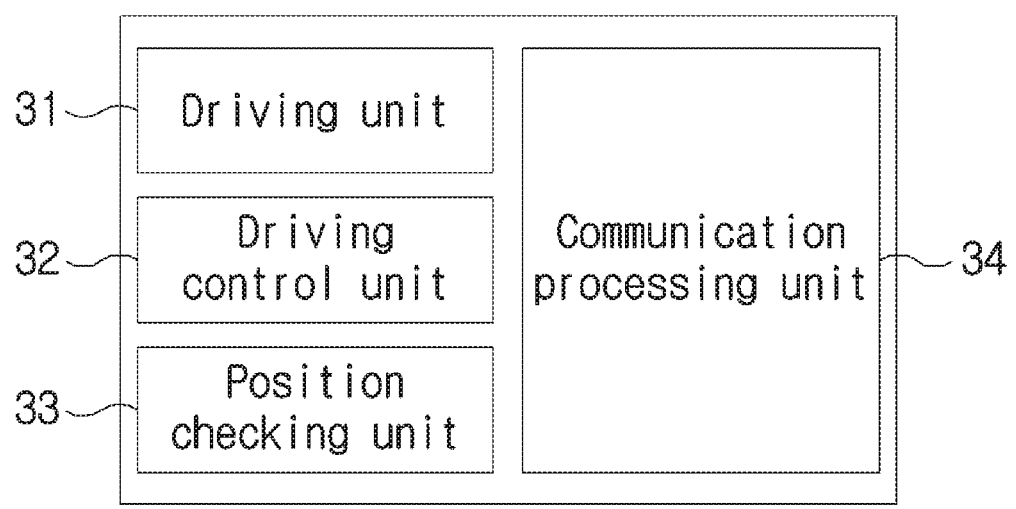
FIGS. 3A and 3B are exemplary diagrams illustrating configuration of an unmanned aerial vehicle in FIG. 1.
Figure 3B:
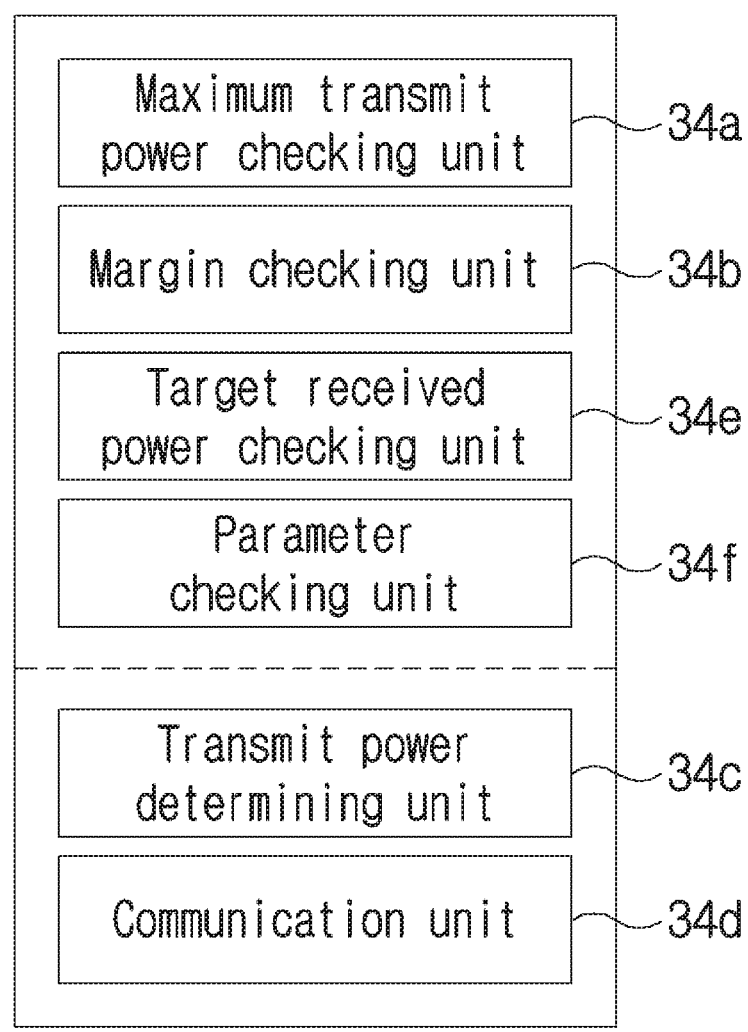

FIGS. 3A and 3B are exemplary diagrams illustrating configuration of the unmanned aerial vehicle in FIG. 1.

Referring to FIGS. 3A and 3B, the unmanned aerial vehicle may include a driving unit 31, a driving control unit 32, a position checking unit 33, and a communication processing unit 34.

The driving unit 31 may include: at least one rotary motor; at least one rotor (or wheel) coupled to the at least one rotary motor; and a motion sensor detecting motion of the unmanned aerial vehicle 11.

The driving control unit 32 may generate a control signal for moving the unmanned aerial vehicle to at least one way point. The control signal may include a signal for moving the position of the unmanned aerial vehicle 11 to the way point by driving at least one rotary motor. Further, the control signal may include a signal for moving the unmanned aerial vehicle 11 to the way point while stably maintaining positioning of the unmanned aerial vehicle 11 by applying motion information detected by the motion sensor.

The position checking unit 33 may include a module, for example a GPS module, and the like, to check the current position of the unmanned aerial vehicle. The position checking unit 33 may provide the current position of the unmanned aerial vehicle to the driving control unit 32. The driving control unit 32 may generate the control signal for moving to the at least one way point while checking the current position.

The communication processing unit 34 may control the power of the signal to be transmitted to the ground radio station on the basis of an open-type power control scheme.

The communication processing unit 34 may include a maximum transmit power checking unit 34a, a margin checking unit 34b, a transmit power determining unit 34c, and a communication unit 34d.

The maximum transmit power checking unit 34a may check the maximum transmit power Pmax of the ground radio station to which the unmanned aerial vehicle is connected. The maximum transmit power Pmax may be received in the process of connecting the unmanned aerial vehicle to the ground radio station and be stored, or may be stored as a predetermined value for connection between the unmanned aerial vehicle and the ground radio station.

The margin checking unit 34b may check a margin which is set to ensure the communication link with high reliability for safe navigation. For example, the margin checking unit 34b may check the margin through the calculation in Equation 1 below.

$$M\text{safety}=M\text{EPL}+M\text{ASL}+M\text{RFI}+M\text{ICAO} \quad \text{[Equation 1]}$$

Here, Msafety denotes a total margin value; MEPL denotes a margin for random excess path loss due to multipath fading; MASL denotes a margin for random air frame shadowing loss which may be caused by the state of the unmanned aerial vehicle, for example, roll, yaw, and pitch states; MRFI denotes a margin for random RF interference; and MICAO denotes a safety margin required in International Civil Aviation Organization (ICAO).

The maximum transmit power checking unit 34a and the margin checking unit 34b may provide the maximum transmit power Pmax and the margin Msafety to the transmit power determining unit 34c, respectively. In response, the transmit power determining unit 34c may determine a transmit power using the maximum transmit power Pmax and the margin Msafety.

Specifically, the transmit power determining unit 34c may check a required transmit power P_required. The required transmit power may be checked through the calculation in Equation 2 below.

$$P\_\text{required}=P\text{target\_received}+PL+kQ1((\Delta E(i)=P\text{pilot}(i)-P\text{pilot}(i-1))+M\text{safety} \quad \text{[Equation 2]}$$

Here, Ptarget_received denotes a target received power for the ground radio station; Ppilot(i) denotes a received power with respect to the i-th subframe measured by the unmanned aerial vehicle; PL denotes a Ppilot(i)-based path loss estimated value calculated by the unmanned aerial vehicle; and Msafety denotes a margin value.

The communication processing unit 34 may further include a target received power checking unit 34e for checking a target received power Ptarget_received. The target received power checking unit 34e may check the target received power through the calculation in Equation 3 below.

$$P\text{target\_received}=\text{SNRrequired}+N-Gtx-Grx \quad \text{[Equation 3]}$$

Here, SNRrequired denotes signal-to-noise power ratio required to satisfy FER=10−3; N denotes a noise power within a reception bandwidth; Gtx denotes a transmission antenna gain; and Grx denotes a reception antenna gain.

In the meantime, in Equation 2, parameter k indicates channel prediction possibility. The parameter k is set to one when channel prediction through a pilot is possible, or is set to zero when channel prediction using the pilot is impossible. Also, in Equation 2, parameter Q1 indicates a prediction index and indicates how much a channel variation prediction value is applied to P(i). The parameter Q1 may be set to a value in a range of zero to one. The communication processing unit 34 may further include a parameter checking unit 34f capable of calculating parameters k and Q1.

In the meantime, the transmit power determining unit 34c may check the maximum transmit power and the required transmit power, and may determine the transmit power by comparing the maximum transmit power with the required transmit power. For example, as shown Equation 4 in below, the transmit power determining unit 34c may determine one of the maximum transmit power and the required transmit power, of which the value is relatively low, as the transmit power.

$$P(i)=\min(10\log 10(P\text{max}),10\log 10(P\_\text{required}))\ [\text{dBm}] \quad \text{[Equation 4]}$$

Further, the transmit power determining unit 34c and the communication unit 34d of the communication processing unit 34 may be provided in the physical layer. The maximum transmit power checking unit 34a, the margin checking unit 34b, the target received power checking unit 34e, the parameter checking unit 34f, and the like may be provided in the upper layer of the physical layer.

Figure 4:
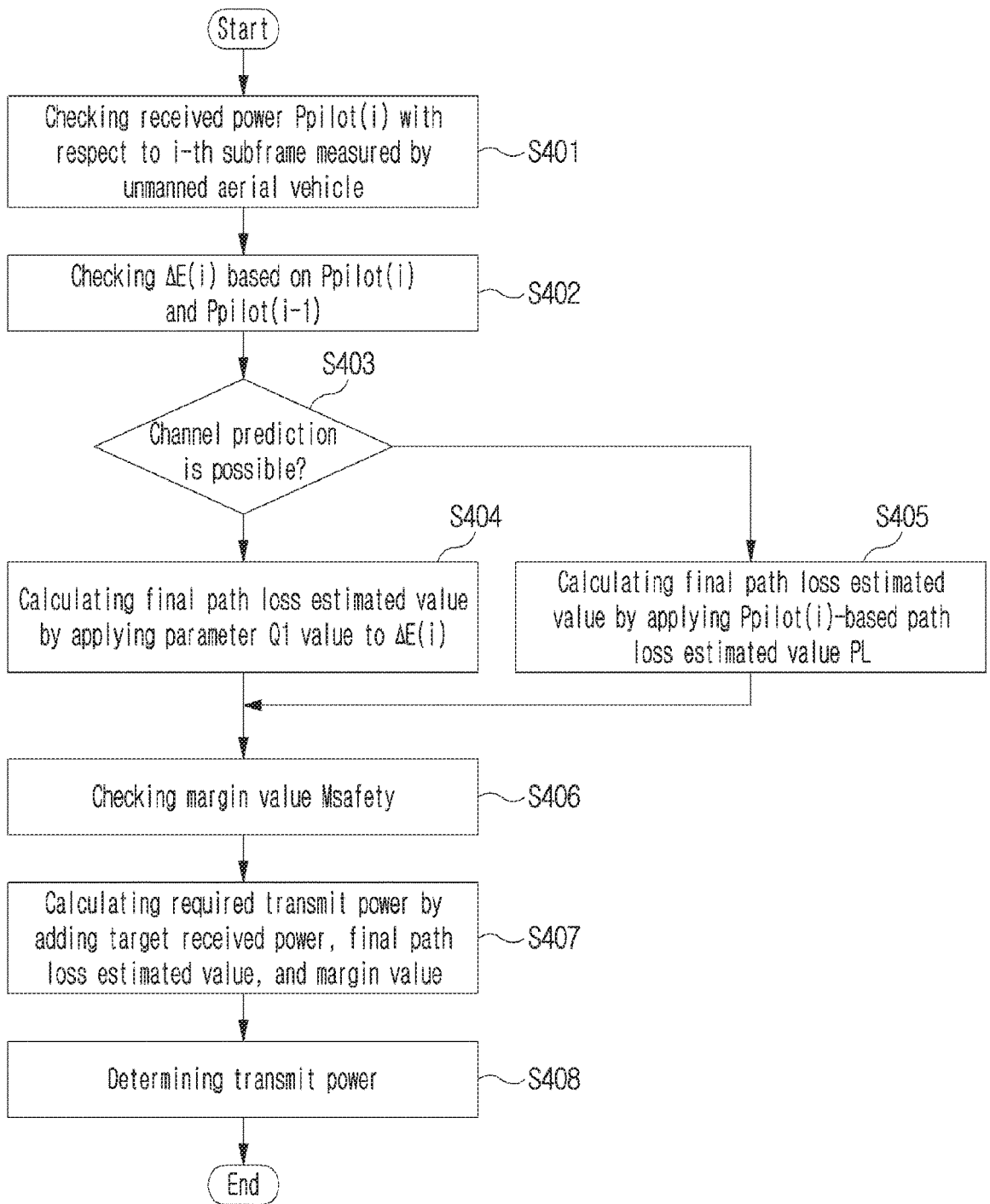
FIG. 4 is an exemplary diagram illustrating an operation of determining a transmit power by a transmit power determining unit in FIGS. 3A and 3B.

FIG. 4 is an exemplary diagram illustrating an operation of determining a transmit power by the transmit power determining unit in FIGS. 3A and 3B.

Referring to FIG. 4, the transmit power determining unit may check a received power with respect to the i-th subframe measured by the unmanned aerial vehicle at step S401. Using the received power with respect to the i-th subframe measured by the unmanned aerial vehicle, a difference $\Delta E(i)$ to a received power with respect to the i−1-th subframe measured by the unmanned aerial vehicle may be checked at step S402.

Next, the transmit power determining unit 34c may make a request to the parameter checking unit 34f for values of the parameters k and Q1 and may receive the values of the parameters k and Q1 from the parameter checking unit 34f. The transmit power determining unit 34c checks the value of the parameter k received from the parameter checking unit 34f.

When the value of the parameter k indicates that channel prediction through the pilot is possible at step S403— "YES", the value of the parameter Q1 is applied to the difference $\Delta E(i)$ in the received power of the subframe, thereby the final path loss estimated value is calculated at step S404. In contrast, when the transmit power determining unit 34c checks that the value of the parameter k received from the parameter checking unit 34f indicates that channel prediction through the pilot is impossible at step S403— "NO", the Ppilot(i)-based path loss estimated value PL calculated by the unmanned aerial vehicle is applied to calculate the final path loss estimated value at step S405.

The transmit power determining unit 34c may make a request to the margin checking unit 34b for the margin value Msafety, and may receive the margin value Msafety calculated by the margin checking unit 34b at step S406. The transmit power determining unit 34c may calculate the required transmit power P_required by adding target received power Ptarget_received, the final path loss estimated value, and the margin value Msafety at step S407.

The transmit power determining unit 34c may make a request to the maximum transmit power checking unit 34a for the maximum transmit power Pmax and may receive the maximum transmit power Pmax. The transmit power determining unit 34c may compare the maximum transmit power Pmax with the required transmit power P_required to determine one, of which the value is relatively low, as the transmit power at step S408.

Described is that the unmanned aerial vehicle controls the power of the signal to be transmitted to the ground radio station on the basis of the open-type power control scheme. Hereinafter, in another embodiment of the present disclosure, described is a configuration that the power of the signal transmitted by the ground radio station and the unmanned aerial vehicle is controlled on the basis of a closed-type power control scheme.

Figure 5:
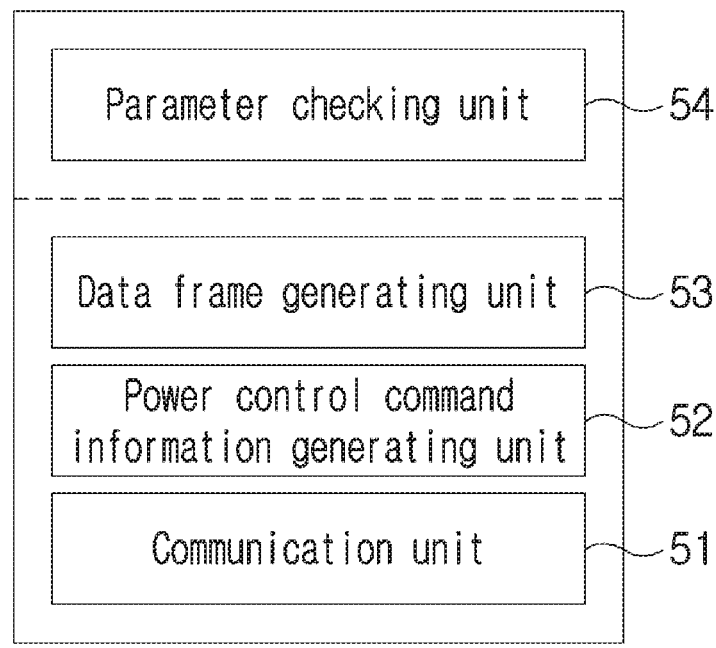
FIG. 5 is a block diagram illustrating an example of configuration of a ground radio station in FIG. 1.

FIG. 5 is a block diagram illustrating an example of configuration of the ground radio station in FIG. 1.

Referring to FIG. 5, the ground radio station may include a communication unit 51, a power control command information generating unit 52, and a data frame generating unit 53.

The communication unit 51 may connect the unmanned aerial vehicle to the ground radio station via the mission data link and the non-mission data link, and may process transmission and reception of the data frame.

The power control command information generating unit 52 may generate power control command information on the basis of the signal received from the unmanned aerial vehicle via the non-mission data link.

The power control command information generating unit 52 may check a difference $\Delta\varepsilon(i)$ between a received power Pest(i) estimated in the i-th frame and a target received power Ptarget for supporting a given symbol rate through the calculation in Equation 5 below.

$$\Delta\varepsilon(i)=PS\text{Dest}(i)-PS\text{Dtarget} \quad \text{[Equation 5]}$$

The power control command information generating unit 52 may calculate a difference prediction value $\Delta\varepsilon,c(i)$ between the received power and the target power after a round-trip propagation delay time through Equation 6 below.

$$\Delta\varepsilon,c(i)=\Delta\varepsilon(i)+kQ2(P\text{est}(i)-P\text{est}(i-1)) \quad \text{[Equation 6]}$$

Here, the parameter k is the parameter indicating channel prediction possibility. The parameter k is set to one when channel prediction through the pilot is possible, or is set to zero when channel prediction using the pilot is impossible. Also, in Equation 6, the parameter Q1 indicates the prediction index and indicates how much the channel variation prediction value is applied to P(i). The parameter Q1 may be set to a value in a range of zero to one. The ground radio station may further include a parameter checking unit 54 capable of calculating the parameters k and Q1.

The power control command information generating unit 52 may make a request to the parameter checking unit 54 for the parameters k and Q1, and in response, may receive the parameters k and Q1 from the parameter checking unit 54.

Further, the parameter checking unit 54 may be provided in the upper layer of the physical layer.

The power control command information generating unit 52 may generate the power control command information using the difference prediction value $\Delta\varepsilon,c(i)$. For example, the power control command information generating unit 52 may determine a TPC command value $D_p(i)$ through Equation 7 below and may generate the power control command information including the TPC command value $D_p(i)$.

$$\begin{aligned}&\text{if } |\Delta\varepsilon,c(i)|<e_r \text{ and } \Delta\varepsilon,c(i)<0, D_p(i)=1 \text{ dB}\\&\text{if } |\Delta\varepsilon,c(i)|<e_r \text{ and } \Delta\varepsilon,c(i)>0, D_p(i)=0 \text{ dB}\\&\text{if } |\Delta\varepsilon,c(i)|<e_r \text{ and } \Delta\varepsilon,c(i)<0, D_p(i)=3 \text{ dB}\\&\text{if } |\Delta\varepsilon,c(i)|>e_r \text{ and } \Delta\varepsilon,c(i)>0, D_p(i)=-1 \text{ dB}\end{aligned} \quad \text{[Equation 7]}$$

Here, the $D_p(i)$ level is described as [−1, 0, 3, 1], but the present disclosure is not limited thereto and may be variously changed by those skilled in the art. Also, not the TPC on the basis of four steps, a PCC command value may be generated on the basis of two steps or eight steps.

Figure 6:
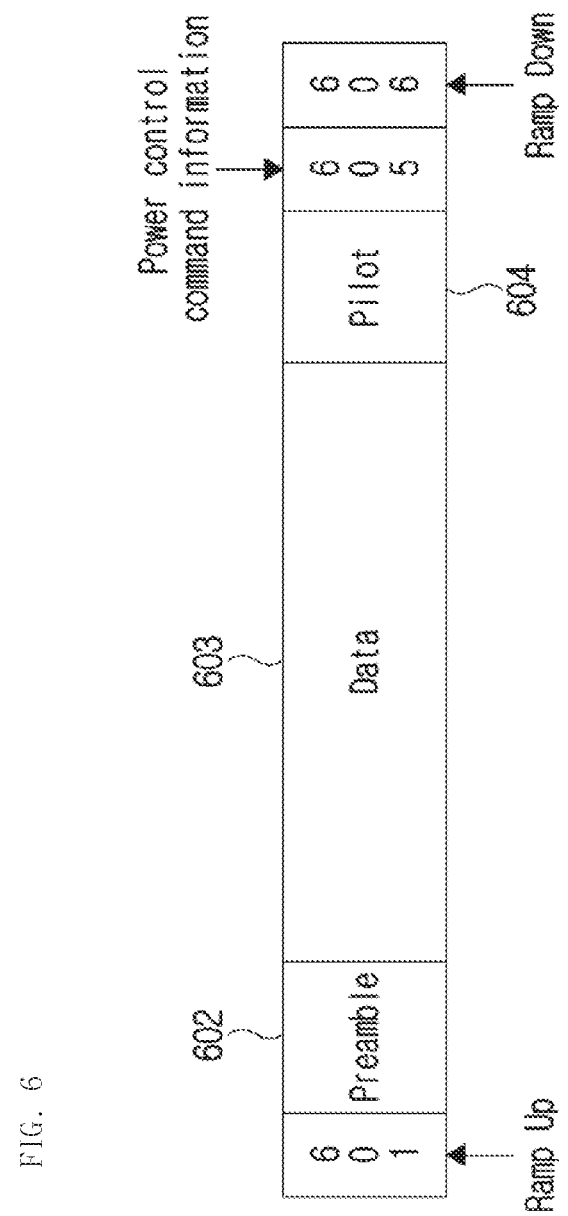
FIG. 6 is a diagram illustrating a structure of a data frame used in the ground radio station in FIG. 5.

The power control command information generating unit 52 may provide the power control command information to the data frame generating unit 53. The data frame generating unit 53 may generate a data frame 600 (referring to FIG. 6) including the power control command information.

The data frame 600 may include a ramp-up section 601, a preamble section 602, a data section 603, a pilot section 604, a power control command information section 605, and a ramp-down section 606. It is desirable that the power control command information section 605 is provided between the pilot section 604 and the ramp-down section 606.

When the power control command information is provided with the TPC based on four steps, the power control command information section 605 is configured of two bits. Further, when the power control command information includes the PCC command value based on two steps or eight steps, the power control command information section 605 is configured of one bit or three bits.

In the meantime, in order to transmit the power control command information to the unmanned aerial vehicle while maintaining compatibility with the existing unmanned aerial vehicle CNPC physical layer standard, a portion of data provided from the upper layer to the physical layer is allocated as bits for the power control command information section 605. However, when the portion of the data provided from the upper layer to the physical layer is allocated for the power control command information section 605, it is impossible to transmit as data much as the size of bits allocated for the power control command information section 605. In the embodiment of the present disclosure, the data frame generating unit 53 may construct the data frame that is compatible with the pre-established CNPC system while transmitting the data provided from the upper layer to the physical layer.

The data frame is configured in such a manner as to provide the power control command information section 605 between the pilot section 604 and the ramp-down section 606. Thus, the unmanned aerial vehicle provided in the unmanned aerial vehicle control system according to the embodiment of the present disclosure may check the power control command information section 605, may check the power control command information included in the power control command information section 605, and may control the transmit power using the power control command information.

In the meantime, the pre-established CNPC system recognizes the section positioned after the pilot section 604 as the ramp-down section, and therefore even the data frame of the above-described structure is transmitted, whereby the power control command information section 605 and the ramp-down to section 606, which are positioned after the pilot section 604, are discarded without being detected. As described above, according to the embodiment of the present disclosure, the data frame generated by the unmanned aerial vehicle control system is used compatibly in the pre-established CNPC system.

Figure 7:
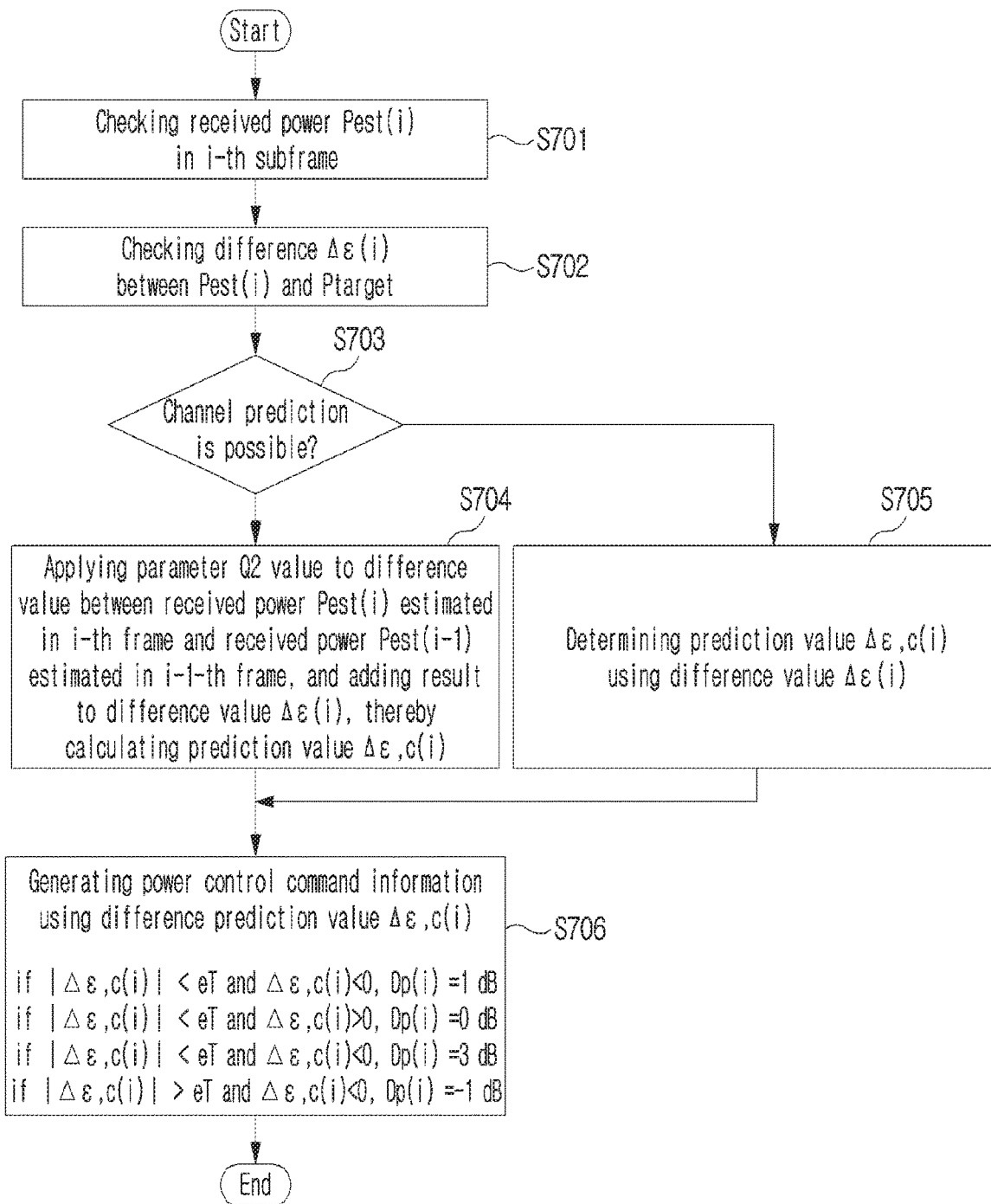
FIG. 7 is an exemplary diagram illustrating an operation of generating power control command information by a power control command information generating unit in FIG. 5.

FIG. 7 is an exemplary diagram illustrating an operation of generating power control command information by the power control command information generating unit in FIG. 5.

Referring to FIG. 7, the power control command information generating unit 52 may check the received power $P_{est}(i)$ estimated in the i-th frame at step S701.

The power control command information generating unit 52 may check the difference $\Delta\varepsilon(i)$ between the received power $P_{est}(i)$ estimated in the i-th frame and the target received power $P_{target}$ for supporting the given symbol rate at step S702.

Next, the power control command information generating unit 52 may make a request to the parameter checking unit 54 for the values of the parameters k and Q2 and may receive the values of the parameters k and Q2 from the parameter checking unit 54. The power control command information generating unit checks the value of the parameter k received from the parameter checking unit 54. When the value of the parameter k indicates that channel prediction through the pilot is possible at step S703—"YES", the difference prediction value $\Delta\varepsilon,c(i)$ between the received power and the target power after the round-trip propagation delay time is checked at step S704.

At step S704, the power control command information generating unit 52 may apply the value of the parameter Q2 to the difference value between the received power $P_{est}(i)$ estimated in the i-th frame and the received power $P_{est}(i-1)$ estimated in the i−1-th frame, and may add the result to the difference value $\Delta\varepsilon(i)$, thereby calculating the prediction value $\Delta\varepsilon,c(i)$.

In contrast, when the value of the parameter k received from the parameter checking unit 54 indicates that channel prediction through the pilot is impossible at step S703—"NO", the above-described difference value $\Delta\varepsilon(i)$ is calculated as the prediction value $\Delta\varepsilon,c(i)$ at step S705.

Also, the power control command information generating unit 52 may generate the power control command information using the difference prediction value $\Delta\varepsilon,c(i)$ at step S706. For example, as shown in Equation 7, the power control command information generating unit 52 may determine the TPC command value $D_p(i)$ considering the size of the prediction value $\Delta\varepsilon,c(i)$ and the difference value $\Delta\varepsilon(i)$, and may generate the power control command information including the TPC command value $D_p(i)$.

In the embodiment of the present disclosure, the $D_p(i)$ level is described as [−1, 0, 3, 1], but the present disclosure is not limited thereto and may be variously changed by those skilled in the art. Also, the PCC command value may be generated on the basis of two steps or eight steps, rather than the TPC on the basis of four steps.

Figure 8:
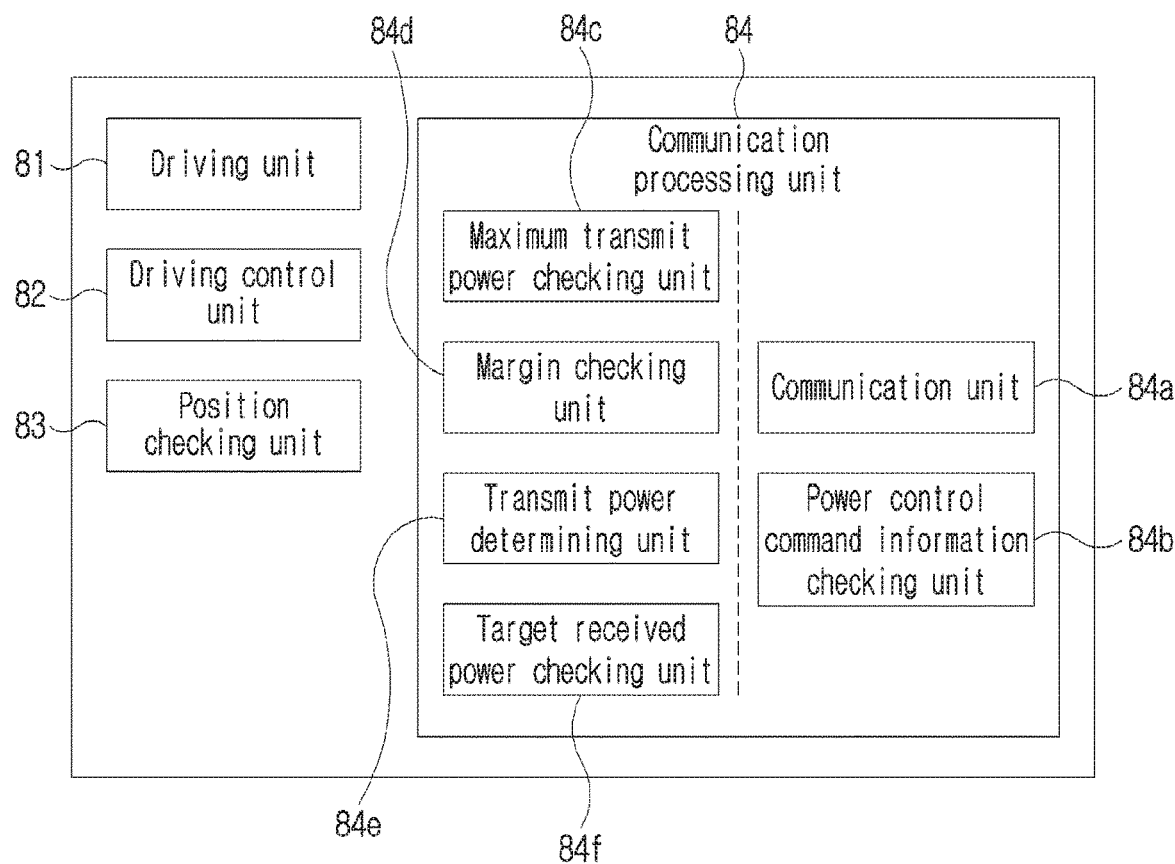
FIG. 8 is a block diagram illustrating an example of configuration of the unmanned aerial vehicle in FIG. 1.

FIG. 8 is a block diagram illustrating an example of configuration of the unmanned aerial vehicle in FIG. 1.

Referring to FIG. 8, the unmanned aerial vehicle may include a driving unit 81, a driving control unit 82, a position checking unit 83, and a communication processing unit 84. Since the driving unit 81, the driving control unit 82, and the position checking unit 83 of the unmanned aerial vehicle 80 are provided in the same manner as the driving unit 31, the driving control unit 32, and the position checking unit which are described with reference to FIGS. 3A and 3B, the specific configuration and operation of the driving unit 81, the driving control unit 82, and the position checking unit 83 refer to the configuration and operation of the driving unit 31, the driving control unit 32, and the position checking unit 33.

The communication processing unit 84 may include a communication unit 84a, a power control command information checking unit 84b, a maximum transmit power checking unit 84c, a margin checking unit 84d, and a transmit power determining unit 84e.

The communication unit 84a may make a connection to the ground radio station via the mission data link and the non-mission data link. Also, the communication unit 84a may generate the data frame to be transmitted to the ground radio station and may transmit the data frame with the power determined by the transmit power determining unit 84*e*.

Also, the communication unit 84*a* may receive the data frame from the ground radio station, may perform parsing on the received data frame, and may transmit the data on which parsing is performed, to the upper layer. Particularly, the communication unit 84*a* may check the power control command information section 605 included in the data frame, may detect the power control command information included in the power control command information section 605, and may transmit the detected power control command information to the upper layer.

The power control command information checking unit 84*b* may check power control command information and may store and manage data on the power control command information.

The power control command information checking unit 84*b* may calculate the transmit power control value $\delta(i)$ using the received power control command information for physical layer transmission in the i-th frame. The transmit power control value $\delta(i)$ may be obtained through the calculation in Equation below.

$$\delta(i) = D_p(i) - Q3 D_p(i-1) \qquad \text{[Equation 8]}$$

Here, Q3 is a delay compensation index which is a value in a range of zero to one.

Also, the power control command information checking unit 84*b* may receive a request from the transmit power determining unit 84*e* to provide the power control command information, and in response, the power control command information may be provided to the transmit power determining unit 84*e*.

The maximum transmit power checking unit 84*c* may check the maximum transmit power Pmax of the ground radio station connected to the unmanned aerial vehicle. The maximum transmit power Pmax may be received in the process of connecting the unmanned aerial vehicle to the ground radio station and be stored, or may be stored as the predetermined value for connection between the unmanned aerial vehicle and the ground radio station.

The margin checking unit 84*d* may check the margin which is set to ensure the communication link with high reliability for safe navigation. For example, the margin checking unit 84*d* may check the margin through the above-described calculation in Equation 1.

The maximum transmit power checking unit 84*c* and the margin checking unit 84*d* may provide the maximum transmit power Pmax and the margin Msafety to the transmit power determining unit 84*e*, respectively. In response, the transmit power determining unit 84*e* may determine the transmit power using the maximum transmit power Pmax and the margin Msafety.

Specifically, the transmit power determining unit 84*e* may check the required transmit power P_required. The required transmit power may be checked through the calculation in Equation 9 below.

$$P\_\text{required} = P\text{target\_received} + PL + M\text{safety} + \delta(i) \qquad \text{[Equation 9]}$$

Here, Ptarget_received denotes the target received power with respect to the ground radio station; Ppilot(i) denotes the received power with respect to the i-th subframe measured by the unmanned aerial vehicle; PL denotes the Ppilot(i)-based path loss estimated value calculated by the unmanned aerial vehicle; and Msafety denotes the margin value.

The communication processing unit 84 may further include a target received power checking unit 84*f* for checking a target received power Ptarget_received, and the target received power checking unit 84*f* may check the target received power through the above-described calculation in Equation 3.

In the meantime, the transmit power determining unit 84*e* may check the maximum transmit power and the required transmit power and may determine the transmit power P(i) by comparing the maximum transmit power with the required transmit power. For example, as shown in Equation 10 below, the transmit power determining unit 84*e* may determine one of the maximum transmit power and the required transmit power, of which the value is relatively low, as the transmit power.

$$P(i) = \min(10 \log 10(P\text{max}), 10 \log 10(P\_\text{required})) \quad \text{[dBm]} \qquad \text{[Equation 10]}$$

Further, the communication unit 84*a* and the transmit power determining unit 84*e* of the communication processing unit 84 may be provided in the physical layer. The power control command information checking unit 84*b*, the maximum transmit power checking unit 84*c*, the margin checking unit 84*d*, the target received power checking unit 84*f*, and the like may be provided in the upper layer of the physical layer.

Figure 9:
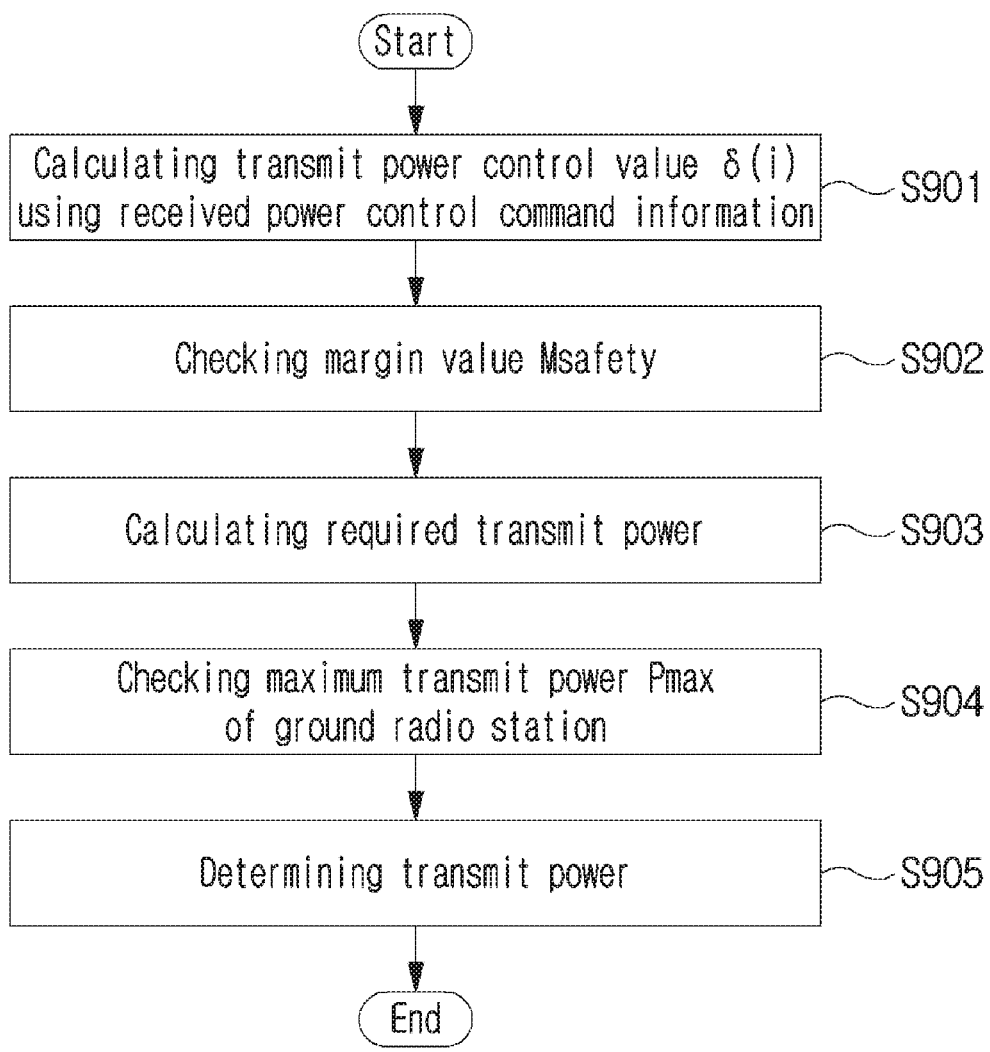
FIG. 9 is an exemplary diagram illustrating an operation of determining a transmit power by a communication processing unit in FIG. 8.

FIG. 9 is an exemplary diagram illustrating an operation of determining the transmit power by the communication processing unit in FIG. 8.

Referring to FIG. 9, the communication unit 84*a* may receive the data frame from the ground radio station, may check the power control command information section 605 included in the data frame, may detect the power control command information included in the power control command information section 605, and may provide the detected power control command information to the power control command information checking unit 84*b*. Accordingly, the power control command information checking unit 84*b* may check the power control command information and may calculate the transmit power control value $\delta(i)$ using the power control command information received for physical layer transmission in the i-th frame at step S901. Here, the transmit power control value $\delta(i)$ may be obtained through the above-described calculation in Equation 8.

Next, the margin checking unit 84*d* may check the margin which is set to ensure the communication link with high reliability for safe navigation at step S902. For example, the margin checking unit 84*d* may check the margin through the above-described calculation in Equation 1.

The power control command information checking unit 84*b* and the margin checking unit 84*d* may provide the power control command information and the margin Msafety to the transmit power determining unit 84*e*, respectively. Also, the target received power checking unit 84*f* may check the through the above-described calculation in Equation 3 and may provide the checked target received power to the transmit power determining unit 84*e*. In response, the transmit power determining unit 84*e* may determine the required transmit power P_required using the power control command information, the margin Msafety, the target received power, and the like at step S903.

Also, the maximum transmit power checking unit 84*c* may check the maximum transmit power Pmax of the ground radio station connected to the unmanned aerial vehicle and may provide the maximum transmit power Pmax to the transmit power determining unit 84*e* at step S904. The maximum transmit power Pmax may be received in the process of connecting the unmanned aerial vehicle to the ground radio station and be stored, or may be stored as the predetermined value for connection between the unmanned aerial vehicle and the ground radio station.

Further, the transmit power determining unit 84e may check the maximum transmit power and the required transmit power, which are calculated through the above-described operation, and may determine the transmit power P(i) by comparing the maximum transmit power with the required transmit power. For example, as shown in Equation 10, the transmit power determining unit 84e may determine one of the maximum transmit power and the required transmit power, of which the value is relatively low, as the transmit power.

Figure 10:
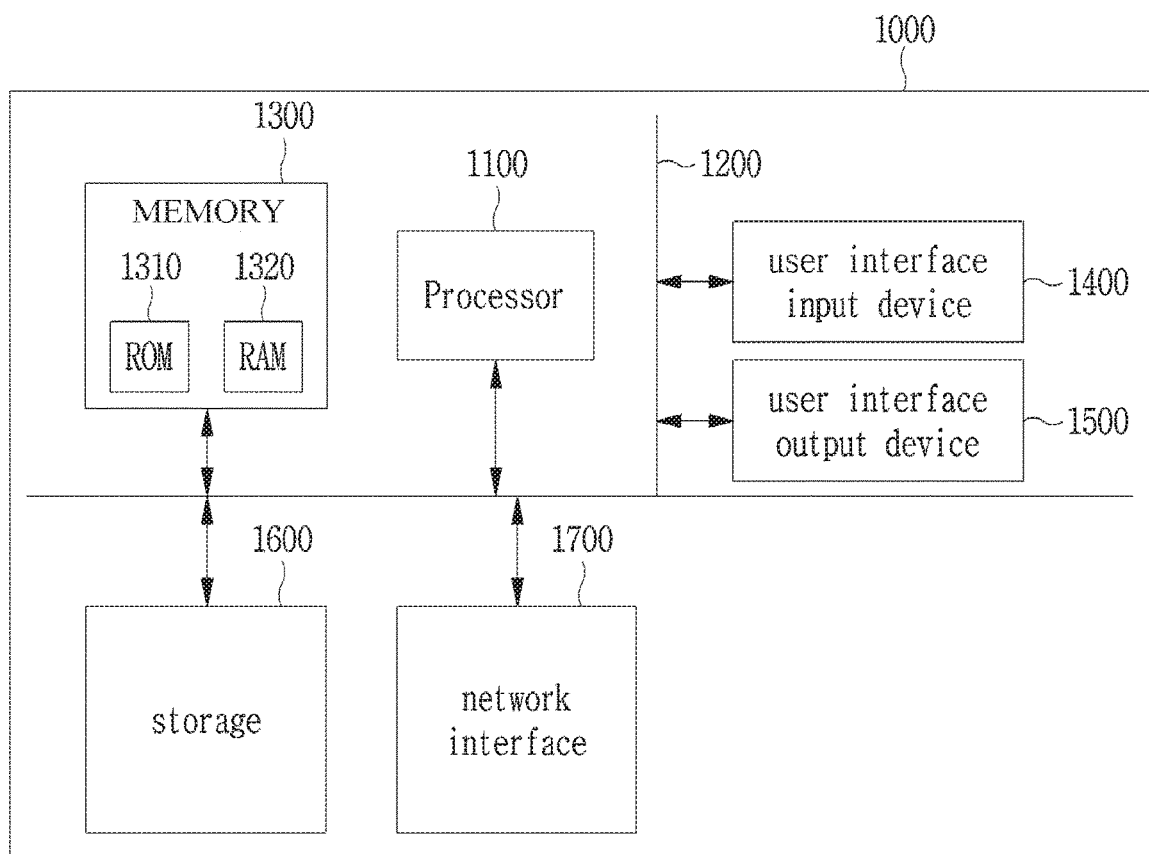
FIG. 10 is a block diagram illustrating an example of a computing system that executes a method and apparatus for transmitting data of an unmanned aerial vehicle control system according to an embodiment of the present disclosure.

FIG. 10 is a block diagram illustrating an example of a computing system that executes a method and apparatus for transmitting data of an unmanned aerial vehicle control system according to an embodiment of the present disclosure.

Referring to FIG. 10, a computing system 100 may include at least one processor 1100 connected through a bus 1200, a memory 1300, a user interface input device 1400, a user interface output device 1500, a storage 1600, and a network interface 1700.

The processor 1100 may be a central processing unit or a semiconductor device that processes commands stored in the memory 1300 and/or the storage 1600. The memory 1300 and the storage 1600 may include various volatile or non-volatile storing media. For example, the memory 1300 may include a ROM (Read Only Memory) and a RAM (Random Access Memory).

Accordingly, the steps of the method or algorithm described in relation to the embodiments of the present disclosure may be directly implemented by a hardware module and a software module, which are operated by the processor 1100, or a combination of the modules. The software module may reside in a storing medium (that is, the memory 1300 and/or the storage 1600) such as a RAM memory, a flash memory, a ROM memory, an EPROM memory, an EEPROM memory, a register, a hard disk, a detachable disk, and a CD-ROM. The exemplary storing media are coupled to the processor 1100 and the processor 1100 can read out information from the storing media and write information on the storing media. Alternatively, the storing media may be integrated with the processor 1100. The processor and storing media may reside in an application specific integrated circuit (ASIC). The ASIC may reside in a user terminal. Alternatively, the processor and storing media may reside as individual components in a user terminal.

The exemplary methods described herein were expressed by a series of operations for clear description, but it does not limit the order of performing the steps, and if necessary, the steps may be performed simultaneously or in different orders. In order to achieve the method of the present disclosure, other steps may be added to the exemplary steps, or the other steps except for some steps may be included, or additional other steps except for some steps may be included.

Various embodiments described herein are provided to not arrange all available combinations, but explain a representative aspect of the present disclosure and the configurations about the embodiments may be applied individually or in combinations of at least two of them.

Further, various embodiments of the present disclosure may be implemented by hardware, firmware, software, or combinations thereof. When hardware is used, the hardware may be implemented by at least one of ASICs (Application Specific Integrated Circuits), DSPs (Digital Signal Processors), DSPDs (Digital Signal Processing Devices), PLDs (Programmable Logic Devices), FPGAs (Field Programmable Gate Arrays), a general processor, a controller, a micro controller, and a micro-processor.

The scope of the present disclosure includes software and device-executable commands (for example, an operating system, applications, firmware, programs) that make the method of the various embodiments of the present disclosure executable on a machine or a computer, and non-transitory computer-readable media that keeps the software or commands and can be executed on a device or a computer.

What is claimed is:

1. A method of transmitting data of an unmanned aerial vehicle control system, the method comprising:
connecting an unmanned aerial vehicle to a ground radio station via a mission data link and a non-mission data link;
checking a maximum transmit power of the non-mission data link;
checking a margin value of the non-mission data link considering a state of the unmanned aerial vehicle;
checking a required transmit power of the non-mission data link by applying the margin value of the non-mission data link; and
determining a transmit power of the non-mission data link by comparing the maximum transmit power with the required transmit power.

2. The method of claim 1, further comprising:
checking at least one selected from a group of a target received power value in the ground radio station, a received power value transmitted to the ground radio station via the non-mission data link, and a loss estimated value of the non-mission data link.

3. The method of claim 2, wherein at the checking of the required transmit power, the required transmit power of the non-mission data link is checked by applying the at least one selected from the group of the target received power value in the ground radio station, the received power value transmitted to the ground radio station via the non-mission data link, and the loss estimated value of the non-mission data link.

4. The method of claim 3, wherein the target received power value in the ground radio station is generated by combining signal-to-noise ratio required in the non-mission data link, a noise power value within a reception bandwidth, a transmission antenna gain value, and a reception antenna gain value.

5. The method of claim 1, wherein the checking of the margin value of the non-mission data link comprises:
checking a margin value for air frame shadowing loss caused by positioning change of the unmanned aerial vehicle.

6. The method of claim 5, wherein the checking of the margin value of the non-mission data link comprises:
checking a margin value for random excess path loss due to multipath fading, a margin value for random RF interference, and a safety margin value required in International Civil Aviation Organization (ICAO); and
determining the margin value of the non-mission data link by combining the margin value for the air frame shadowing loss, the margin value for the random excess path loss due to the multipath fading, the margin value for the random RF interference, and the safety margin value required in the ICAO.

7. A method of transmitting data of an unmanned aerial vehicle control system, the method comprising:

connecting an unmanned aerial vehicle to a ground radio station via a mission data link and a non-mission data link;

receiving a data frame including power control command information from the ground radio station;

checking the power control command information from the data frame;

checking a maximum transmit power of the non-mission data link;

checking a margin value of the non-mission data link considering a state of the unmanned aerial vehicle;

checking a required transmit power of the non-mission data link by applying the power control command information and the margin value of the non-mission data link; and determining a transmit power of the non-mission data link by comparing the maximum transmit power with the required transmit power.

8. The method of claim 7, wherein the data frame comprises a ramp-up section, a preamble field, a data field, a pilot field, a power control command field, and a ramp-down section.

9. The method of claim 7, further comprising:
checking at least one selected from a group of a target received power value in the ground radio station, a received power value transmitted to the ground radio station via the non-mission data link, and a loss estimated value of the non-mission data link.

10. The method of claim 9, wherein at the checking of the required transmit power, the required transmit power of the non-mission data link is checked by applying the at least one selected from the group of the target received power value in the ground radio station, the received power value transmitted to the ground radio station via the non-mission data link, and the loss estimated value of the non-mission data link.

11. The method of claim 10, wherein the target received power value in the ground radio station is generated by combining signal-to-noise ratio required in the non-mission data link, a noise power value within a reception bandwidth, a transmission antenna gain value, and a reception antenna gain value.

12. The method of claim 7, wherein the checking of the margin value of the non-mission data link further comprises:
checking a margin value for air frame shadowing loss caused by positioning change of the unmanned aerial vehicle.

13. The method of claim 12, wherein the checking of the margin value of the non-mission data link comprises:
checking a margin value for random excess path loss due to multipath fading, a margin value for random RF interference, and a safety margin value required in ICAO; and determining the margin value of the non-mission data link by combining the margin value for the air frame shadowing loss, the margin value for the random excess path loss due to the multipath fading, the margin value for the random RF interference, and the safety margin value required in the ICAO.

14. The method of claim 7, wherein the checking of the required transmit power comprises:
checking previous power control command information included in a previous data frame; and calculating a transmit power control value by subtracting the previous power control command information from the power control command information.

15. The method of claim 14, wherein at the calculating of the transmit power control value, the transmit power control value is calculated by applying a predetermined delay compensation index to the previous power control command information.

* * * * *